US007710293B2

(12) United States Patent
Kallqvist

(10) Patent No.: US 7,710,293 B2
(45) Date of Patent: May 4, 2010

(54) METHOD FOR ACCESSING CONTACT INFORMATION

(75) Inventor: Claes Kallqvist, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 753 days.

(21) Appl. No.: 11/556,256

(22) Filed: Nov. 3, 2006

(65) Prior Publication Data

US 2008/0079609 A1 Apr. 3, 2008

Related U.S. Application Data

(60) Provisional application No. 60/843,692, filed on Sep. 11, 2006.

(51) Int. Cl.
*H03M 11/00* (2006.01)
(52) U.S. Cl. .................. 341/22; 379/904; 455/564; 707/3
(58) Field of Classification Search ............... 341/22; 345/156; 707/3; 455/564; 379/904
See application file for complete search history.

(56) References Cited

U.S. PATENT DOCUMENTS

2002/0052196 A1* 5/2002 Padawer et al. ............. 455/414
2004/0054658 A1 3/2004 Spalink et al.
2005/0171933 A1* 8/2005 Stepanich et al. .............. 707/3
2006/0033706 A1* 2/2006 Haitani et al. ............... 345/156

FOREIGN PATENT DOCUMENTS

| EP | 1 193 956 A2 | 4/2002 |
| EP | 1 560 403 A1 | 8/2005 |

OTHER PUBLICATIONS

International Search Report and Written Opinion for PCT/EP2007/051990; Jun. 12, 2007.
Upp, Steven "Automatic Telephone Number Retrieval" *Motorola Technical Developments, Motorola, Inc. 19* 71 (1993) Abstract.

* cited by examiner

*Primary Examiner*—Timothy Edwards, Jr.
(74) *Attorney, Agent, or Firm*—Myers Bigel Sibley & Sajovec

(57) ABSTRACT

A method for accessing contact information in an electronic device, such as a mobile phone, including a display and a plurality of keys, where each key represents one or more characters, comprising the steps of detecting a first input on a key, and presenting a contact stored as a speed dial choice for the key of the first input. When a second input on a key is detected, all contacts stored in a database of the device are searched, and any contact data including the combination of a character represented by the first input key and a character of the second input key are then presented to the user.

9 Claims, 3 Drawing Sheets

METHOD FOR ACCESSING CONTACT INFORMATION

RELATED APPLICATIONS

This application claims priority to U.S. Application Ser. No. 60/843,692 filed Sep. 11, 2006, the disclosure of which is incorporated herein in its entirety.

FIELD OF THE INVENTION

The present invention relates to electronic devices comprising stored contact data, such as telephone numbers, email addresses, and identities. As such, the electronic device may e.g. be a mobile phone or a computer. Such contact data may be accessed using a user interface of the device, typically a display and a set of keys, or a touch-sensitive display. The invention specifically relates to a method for searching and accessing contact data in a simple and straightforward manner, using a reduced number of key steps from the user of the device.

BACKGROUND

Electronic devices used for storing contact data, and, in some embodiments, also for connecting to other devices represented by the stored contact data, include telephone devices and messaging devices. In these types of devices, one or more data memories are employed for storing the contact data. However, as the number of contacts in a memory increases, suitable algorithms are needed in order to search through the database and find information. For example, in a mobile phone, numerous posts of contact data are stored in a digital contact book, in which it is generally possible to search by inputting initial letters of the contact identity. For this purpose, the number keys of the input interface may typically also be used for entering letters or other characters, i.e. a alpha-numerical keyboard. In such a keyboard, key 6 may for instance also be used for entering letters "M", "N", and "O", in accordance with the established art. As an alternative solution, separate letter keys and number keys are provided, such as on a standard typewriter style keyboard, used in connection with a computer or even on a mobile phone.

When a number key is pressed, the number of that key is typically presented in an input field on the display of the device. By continuing to input numbers a full telephone number may eventually be provided, after which a Call command triggers dialing to the input number. However, if the number to be used has been forgotten by the user, the user may enter the contact book and input the initial letters representing the name stored with that contact. On the other hand, if the user has forgotten the name of the person or entity to call, but has a vague idea of the initial digits of the phone number, the contact may still be hard to find. However, for more frequently used addresses, the device may be configured with speed dial choices. As an example, your home number may be stored for number key 1, and your closest friends and family on the subsequent numbers. Then by pressing e.g. key 7, stored in a speed dial memory to be associated with a contact Anna Andersson, and then pressing a Call button, a call to that contact is initiated even though neither the name or number to that contact has been entered or presented. A third type of contact addresses is unsaved numbers, received when a remote party has called the device. If such a party is to be called back, that number has to be searched among the received or missed calls.

Electronic communication devices are means for the masses today, and it is therefore an important factor that they are user friendly to handle. However, having different ways of locating contact addresses in an electronic device, dependent on how the contact data is stored, counteracts this overall objective.

SUMMARY OF THE INVENTION

According to embodiments of the invention, a generally straightforward method for searching and accessing contact data in an electronic device is provided. In accordance with the invention, a method for combined searching using three types of contact data, namely speed dial contacts, contacts stored in a contact book, and unsaved addresses, is provided. The general idea involves two primary steps carried out in the device responsive to user input, where a first input number is interpreted as a speed dial number and triggers presentation of the contact stored as the speed dial choice stored for that number, whereas a second input after the first input triggers searching and presentation of all contacts having either a contact address including the numbers of the two input keys in succession, or the letters of the two input keys in succession. If more than one contact matches the two input numbers or corresponding letters, a list of all such contacts are listed, and may be scrolled for the purpose of locating the contact of interest. By pressing yet one or more keys, the list of matching contacts may be decreased. In some embodiments, the numbers of the input keys are presented in an input field on the display, adjacent to the list of contacts matching the input streak of keys. A highlight may be employed for marking the focus in the display, which may be moved by means of a navigation tool between items in the list presented. Furthermore, a highlighted item may show more information than the other shown items. Furthermore, the highlight may be present directly in the list of retrieved contacts matching the input order of keys, upon the key input. Alternatively, the highlight is presented only after a down or up movement of the navigation tool has been performed, whereas left or right movement of the navigation tool after input of a key results in a cursor being moved in the line of input numbers of the input field, such that input numbers may be deleted or numbers may be inserted within the streak of input numbers.

According to one aspect, embodiments of the invention involve a method for accessing contact information in an electronic device, the device including a display and a plurality of keys, where each key represents one or more characters, comprising:

detecting a first input on a key;
presenting a contact stored as a speed dial choice for the key of the first input;
detecting a second input on a key;
presenting any contact stored in a database of the device, having contact data including the combination of a character represented by the first input key and a character of the second input key.

In some embodiments, each key has the function of a number key. The method comprises presenting contact data in the form of pre-stored telephone numbers including the digit combination of the first input number key and the second input key.

In some embodiments, wherein each key has the function of a letter key, the method comprises presenting contact data in the form of pre-stored contact identities including the combination of any one of the letters represented by the first input key and any one of the letters represented by the second input key.

In some embodiments, wherein each key has the function of a number key, the method comprises presenting contact data in the form of unsaved telephone numbers from received calls, including the digit combination of the first input number key and the second input key.

In some embodiments, the method comprises presenting, for any additional input on a key, only contacts having contact data including the consecutive combination of characters as represented by the input keys.

In some embodiments, the method comprises presenting an input field, in which digits represented by the input keys are displayed, adjacent to presented contact data.

In some embodiments, presenting a contact stored as a speed dial choice for the key of the first input is performed after a preset time period has lapsed since detecting the first input without any intermediate input.

In some embodiments, the method comprises:

operating a navigation key to move a highlight on the display, indicating which contact data is targeted;

pressing a key to perform an action related to the highlighted contact data.

In some embodiments the electronic device is a mobile phone.

BRIEF DESCRIPTION OF THE DRAWINGS

Embodiments of the invention will now be described with reference to the drawings, on which

DETAILED DESCRIPTION OF EMBODIMENTS ACCORDING TO THE INVENTION

Figure 1:
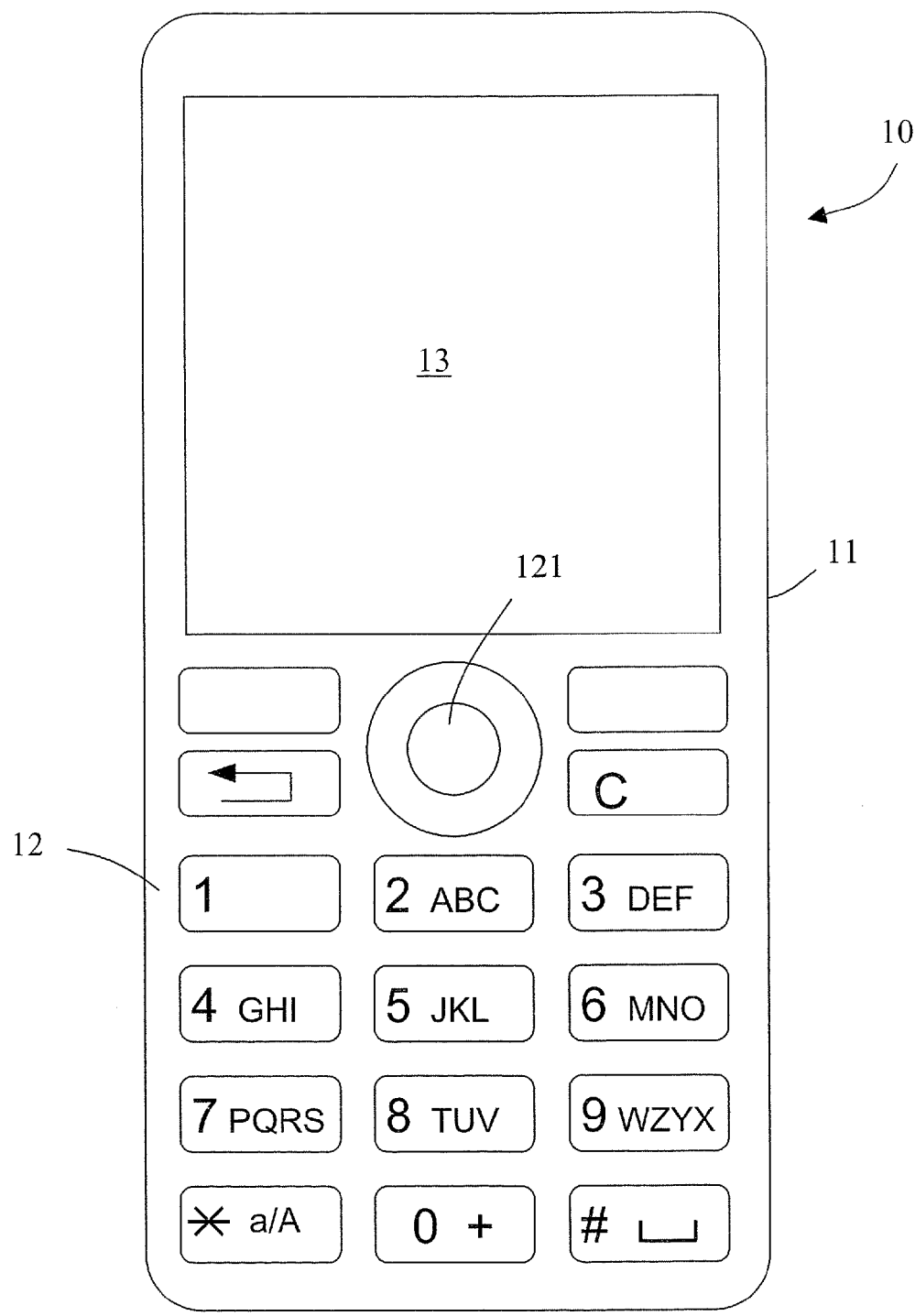
FIG. 1 is a schematic illustration of an electronic device in the form of a mobile phone, in which embodiments of the present invention may be employed.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As used herein, a "mobile terminal" or "portable communications terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

FIG. 1 illustrates an electronic device in the form of a portable communication terminal 10, such as a mobile telephone, according to some embodiments of the invention. Terminal 10 includes a support structure 11 including a housing, and a user interface including a keypad or keyboard 12 with a navigation tool or key 121, and a display 13. The terminal 10 may also include an audio interface including a microphone and a speaker, radio transceiver circuitry, an antenna, a battery, and a microprocessor system including associated software and data memory for radio communication, all carried by support structure 11 and contained within the housing.

Figure 2:
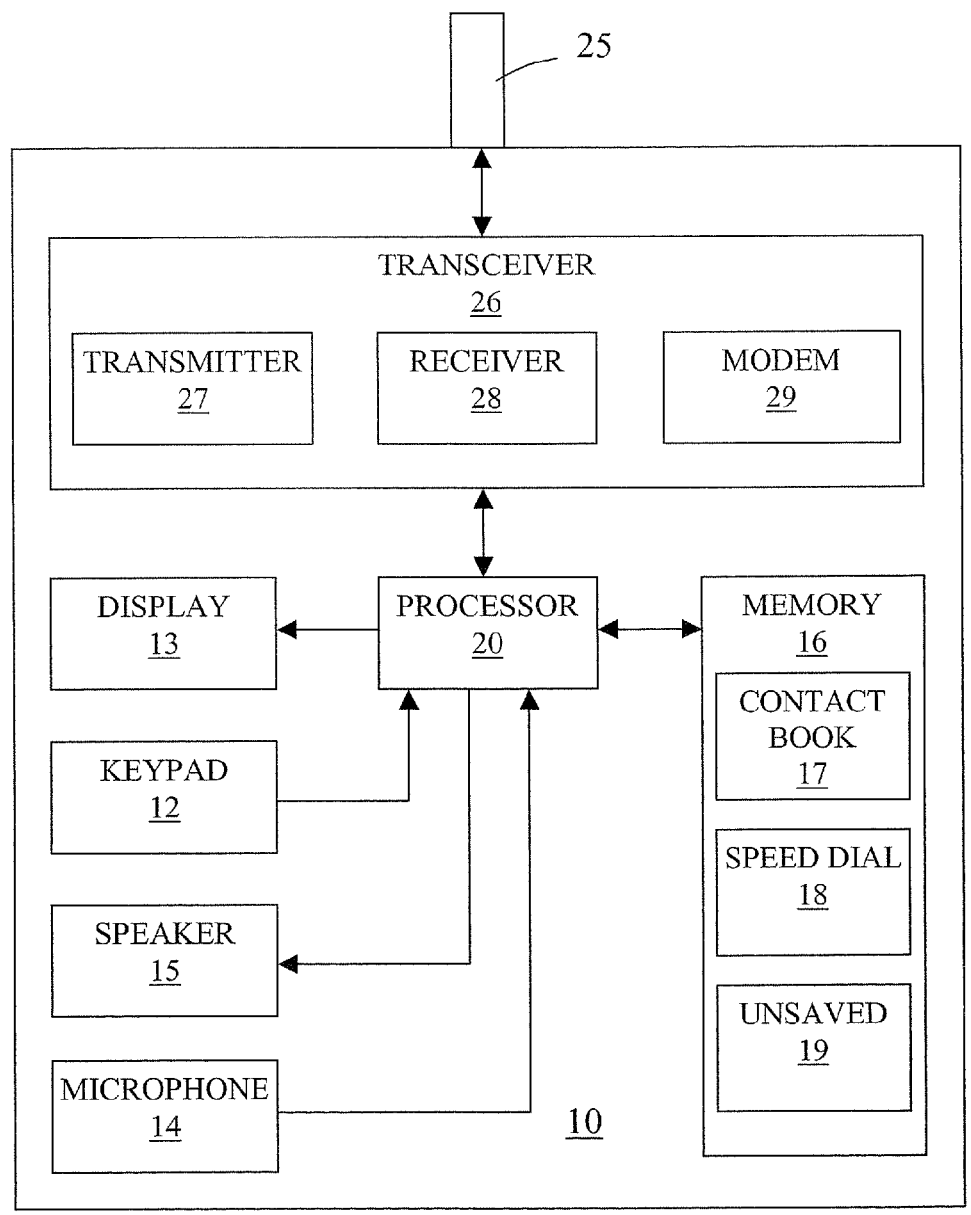
FIG. 2 is a schematic illustration of functional elements of the device of FIG. 1.

Embodiments of the present invention may be further described with reference to the schematic illustration of a communication terminal 10 shown in FIG. 2. Referring to FIG. 2, an exemplary communication terminal 10, in accordance with some embodiments of the present invention, includes a keypad 12, a display 13, a transceiver 26, a memory 16 including a plurality of different databases 17-19, a microphone 14, and a speaker 15. A control unit or processor 20 is configured to control the processes within the terminal, and typically comprises a microprocessor with associated software. The transceiver 26 typically includes a transmitter circuit 27, a receiver circuit 28, and a modem 29, which cooperate to transmit and receive radio frequency signals to remote transceivers via an antenna 25. The radio frequency signals transmitted between the communication terminal 10 and the remote transceivers may comprise both traffic and control signals (e.g., paging signals/messages for incoming calls), which are used to establish and maintain communication with another party or destination.

The memory 16 may include a general purpose memory that is used to store both program instructions for the processor 20 as well as data, such as audio data, video data, configuration data, and/or other data that may be accessed and/or used by the processor 20. The memory 16 may include a nonvolatile read/write memory, a read-only memory and/or a volatile read/write memory. In accordance with certain embodiments, memory 16 includes a database of an electronic contact book 17 with a plurality of contact items defined by name and address information, such as telephone number, email address and so on. The name used for items in the contact book need not be real names of persons, the name may just as well be a user chosen identifying title such as Mom, Taxi, Pharmacy, and so on. Furthermore, memory 16 may include a database for a speed dial memory 18, which links one or more contact addresses to each one of the number keys of keypad 12. In reality, each position in the speed dial memory may be a link to a post in the contact book memory 17. Also, memory 16 may include a temporary data memory 19 for a database of unsaved numbers. Temporary memory 19 is e.g. used for storing call lists, there among telephone numbers of received or missed calls from remote parties. Memory 19 may be temporary in the sense that unsaved numbers are automatically deleted after a predetermined time period counted in days, weeks or months. Alternatively, the temporary memory 19 may hold only a limited number of positions, working on a first in first out basis. In this case, memory 19 is temporary in the sense that an unsaved number is pushed step by step through the list by subsequently received calls until it is pushed out of the list.

Embodiments according to the invention will now be described with reference to FIG. 3, on which information presented on the display 13 of device 10 is shown at different steps of the method.

Figure 3:
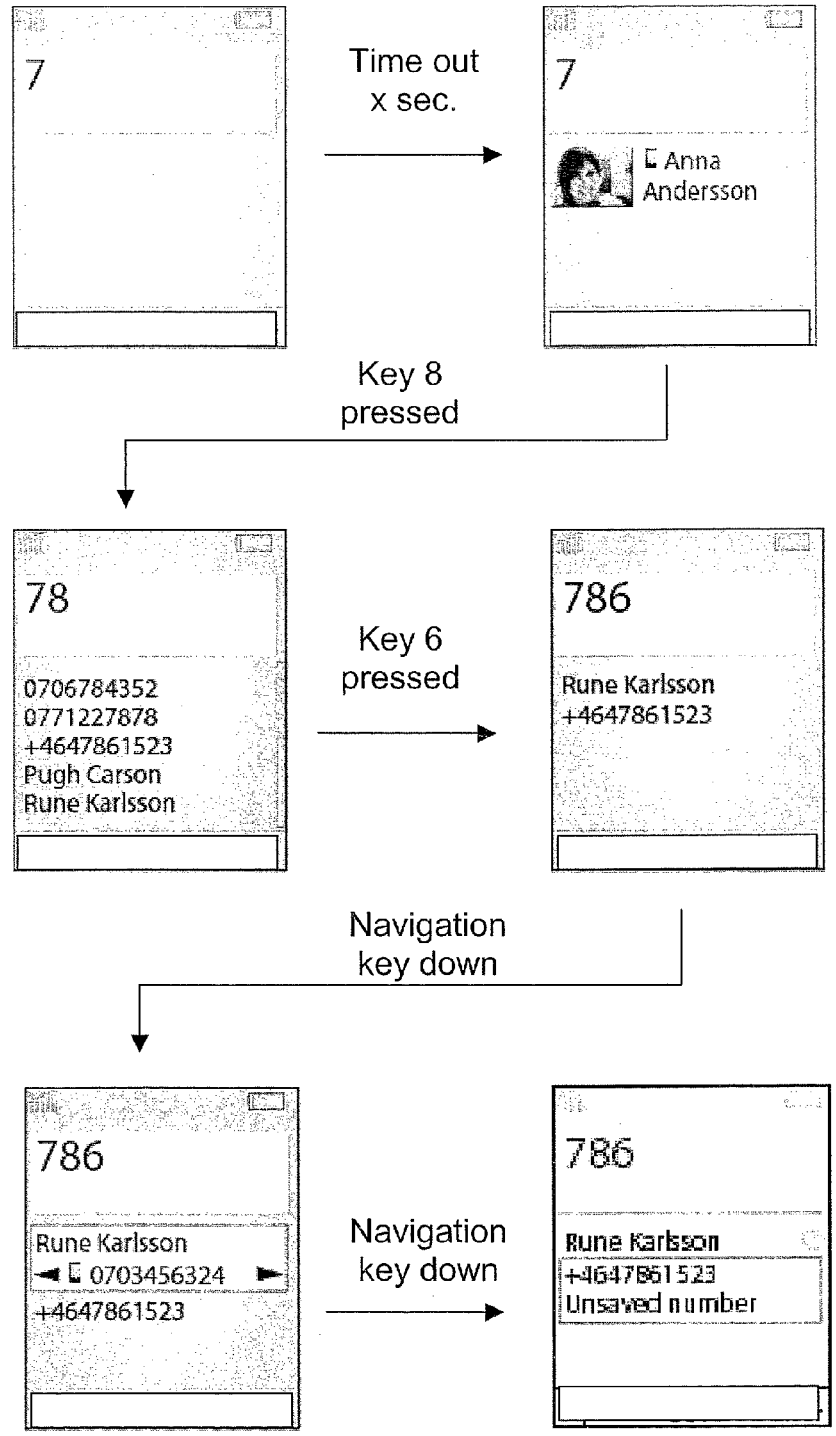
FIG. 3 is a schematic illustration of information presented on a display of an electronic device operated in accordance with embodiments of the invention.

The first display screen of FIG. 3 illustrates how number key 7 has been pressed from standby mode, upon which the digit represented by that key, i.e. 7, is presented in an input field.

After a predetermined time period of x seconds, e.g. 1-3 seconds, a speed dial number linked to number key 7 is retrieved from memory 18, and contact or identity information related to that speed dial number is presented on display 13, such as by name and even with a picture.

The user then presses a number key again, the same or another one. In this example number key 8 is pressed, and the corresponding digit is shown in the input field. Processor 20 then scans the databases 17, 18, 19 for any item matching the combination of any of the characters represented by the successive keys 7 and 8, where key 7 also represents PQRS and key 8 also represents TUV. In the illustrated embodiments, three telephone numbers including the combination 78 are located in memory 16, as well as two contact names including letters matching the combination PU and RU, respectively.

In the forth screen, the user has entered yet another digit by pressing number key 6, and the presented list has now been reduced to two posts, which are the only ones matching the full sequence 786 or the corresponding letter sequences. If an erroneous number key ha been pressed, the C button typically erases the last digit, and by operating navigation key 121 to the left it is also possible to move a cursor to the preceding digits in the input field for processing such as deletion or input of a new digit.

Operating the navigation key 121 downwards activates a highlight on the uppermost contact, upon which both name and number for that contact is presented. This contact can then be called by means of a call command, or e.g. opened for editing by another command. Typically, the call command and other commands related to the presented and highlighted contact may be entered by using a softkey, i.e. one of the unmarked uppermost keys of keypad 12, the present function of which is indicated on display 13 immediately over the respective softkey. Instead of actually calling Rune Karlsson on the indicated mobile phone number, other contact addresses such as other telephone numbers, email addresses, web links etc, associated with that person may be accessed by right or left movement of the navigation key. Alternatively, the highlight is used already from the second screen of FIG. 3, where it highlights the displayed speed dial contact. Progressing to the third and fourth screens, the uppermost contact displayed will automatically be highlighted until the navigation tool is operated to move the highlight to another one of the matching contacts. In this case, the navigation key generally cannot be used for making changes in the number sequence of the input field. Instead this may be done by only using the C button and the number buttons.

In the last screen, the navigation key has been moved down to access the other remaining contact, and when the highlight is placed thereon the fact that this is an unsaved number is shown. The categorization that it is an unsaved number may of course alternatively be presented even without this contact being highlighted.

The invention as exemplified by the embodiments of FIG. 3 may provide varuiys advantages. For example, it combines searching in a contact book, in a speed dial memory, and a list of unsaved numbers, by simply pressing the alphanumerical number keys. Furthermore, the method searches by both numbers and names. Furthermore, the method may also search character combinations in email addresses, which are stored either together with other contact information in the contact book database, or in an inbox of unsaved received email addresses, in the same manner as for telephone numbers. In certain embodiments, the method ignores country codes. A list of the world's different country codes may be therefore stored in memory 16 and used by processor 20 such that when a match has been found between an input sequence of numbers and a stored telephone number, the contact in question is not presented if the matching digits are found within a country code of that telephone number.

The present invention is described herein with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method for accessing contact information in an electronic device, the device including a display and a plurality of keys, where each key represents one or more characters, comprising:
   detecting a first input on a key;
   presenting a contact stored as a speed dial choice for the key of the first input;
   detecting a second input on a key;
   presenting any contact stored in a database of the device, having contact data including the combination of a character represented by the first input key and a character of the second input key;
   operating a navigation key to move a highlight on the display indicating which contact is a highlighted contact;
   accessing other contact addresses associated with the highlighted contact by right or left movement of the navigation key; and
   pressing a key to perform an action related to data of the highlighted contact.

2. The method of claim 1, wherein each key has the function of a number key, comprising:
   presenting contact data in the form of pre-stored telephone numbers including a digit combination of the first input number key and the second input key.

3. The method of claim 1, wherein each key has the function of a letter key, comprising:
   presenting contact data in the form of pre-stored contact identities including the combination of any one of the letters represented by the first input key and any one of the letters represented by the second input key.

4. The method of claim 1, wherein each key has the function of a number key, comprising:
   presenting contact data in the form of unsaved telephone numbers from received calls, including a digit combination of the first input number key and the second input key.

5. The method of claim 1, comprising:
   presenting, for any additional input on a key, only contacts having contact data including a consecutive combination of characters as represented by the input keys.

6. The method of claim 1, comprising:
   presenting an input field, in which digits represented by the input keys are displayed, adjacent to presented contact data.

7. The method of claim 1, wherein presenting a contact stored as a speed dial choice for the key of the first input is performed after a preset time period has lapsed since detecting the first input without any intermediate input.

8. The method of claim 1, comprising:
   operating a navigation key to move a highlight on the display, indicating which contact data is targeted;
   pressing a key to perform an action related to the highlighted contact data.

9. The method of claim 1, wherein the electronic device is a cellular phone.

* * * * *